(12) United States Patent
Alms et al.

(10) Patent No.: US 8,210,841 B2
(45) Date of Patent: Jul. 3, 2012

(54) APPARATUS AND METHOD FOR PREFORM RELAXATION AND FLOW CONTROL IN LIQUID COMPOSITE MOLDING PROCESSES

(75) Inventors: Justin B. Alms, Newark, DE (US); James L. Glancey, Blackbird, DE (US); Suresh G. Advani, Newark, DE (US)

(73) Assignee: University of Delaware, Newark, DE (US)

( * ) Notice: Subject to any disclaimer, the term of this patent is extended or adjusted under 35 U.S.C. 154(b) by 90 days.

(21) Appl. No.: 12/541,004

(22) Filed: Aug. 13, 2009

(65) Prior Publication Data

US 2010/0072677 A1 Mar. 25, 2010

Related U.S. Application Data

(60) Provisional application No. 61/088,444, filed on Aug. 13, 2008.

(51) Int. Cl.
 *B28B 21/36* (2006.01)
(52) U.S. Cl. ......... 425/504; 425/546; 264/258; 264/511
(58) Field of Classification Search .................. 264/258, 264/511; 425/504, 546
See application file for complete search history.

(56) References Cited

U.S. PATENT DOCUMENTS

| | | | |
|---|---|---|---|
| 3,339,239 A | 9/1967 | Peck | |
| 4,622,091 A | 11/1986 | Letterman | |
| 4,902,215 A | 2/1990 | Seemann, III | |
| 5,052,906 A * | 10/1991 | Seemann | 425/112 |
| 5,316,462 A | 5/1994 | Seemann | |
| 5,443,778 A | 8/1995 | Schlingman | |
| 5,772,950 A | 6/1998 | Brustad et al. | |
| 5,885,495 A | 3/1999 | Ibar | |
| 5,902,535 A | 5/1999 | Burgess et al. | |
| 6,298,896 B1 | 10/2001 | Sherrill | |
| 6,299,819 B1 | 10/2001 | Han | |
| 6,406,660 B1 * | 6/2002 | Spurgeon | 264/510 |
| 6,555,045 B2 | 4/2003 | McClure | |
| 7,334,782 B2 | 2/2008 | Woods | |
| 7,517,481 B2 | 4/2009 | Advani et al. | |
| 7,762,122 B2 | 7/2010 | Advani | |
| 2002/0022422 A1 | 2/2002 | Waldrop, III et al. | |

(Continued)

FOREIGN PATENT DOCUMENTS

EP 0045555 A1 8/1981

(Continued)

OTHER PUBLICATIONS

U.S. Appl. No. 12/541,004, filed Mar. 25, 2010, Alms et al.

(Continued)

*Primary Examiner* — Yogendra Gupta
*Assistant Examiner* — Amjad Abraham
(74) *Attorney, Agent, or Firm* — RatnerPrestia (57) ABSTRACT

A vacuum-induced injection molding apparatus is disclosed. The apparatus includes a tool surface having an injection port extending therethrough. A flexible film extends over and is sealingly coupled to the tool surface. The flexible film comprises an outer surface and an inner surface such that the flexible film inner surface and the tool surface define a volume. A vacuum chamber is sealingly coupled to the outer surface of the flexible film. A vacuum port is in fluid communication with the volume. A method of injection molding a polymer matrix composite is also disclosed.

15 Claims, 4 Drawing Sheets

U.S. PATENT DOCUMENTS

| | | |
|---|---|---|
| 2002/0081147 A1 | 6/2002 | Gianaris |
| 2002/0155186 A1 | 10/2002 | Walsh |
| 2003/0111773 A1 | 6/2003 | Janusson |
| 2003/0211194 A1 | 11/2003 | Louderback et al. |
| 2004/0049324 A1 | 3/2004 | Walker |
| 2004/0109909 A1 | 6/2004 | Dubay |
| 2005/0042961 A1 | 2/2005 | Lehmann et al. |
| 2005/0053765 A1 | 3/2005 | Albers et al. |
| 2005/0253309 A1 | 11/2005 | Hou et al. |
| 2006/0255500 A1 | 11/2006 | Advani |
| 2007/0063393 A1* | 3/2007 | Vernin et al. ............... 264/511 |
| 2007/0158874 A1 | 7/2007 | Van Herpt |
| 2009/0273107 A1 | 11/2009 | Advani et al. |
| 2011/0046771 A1 | 2/2011 | Alms |

FOREIGN PATENT DOCUMENTS

| | | |
|---|---|---|
| WO | WO 2004/101259 A2 | 11/2004 |
| WO | WO 2007/040797 A3 | 4/2007 |
| WO | WO 2007040797 A2 * | 4/2007 |
| WO | WO 2007054101 A1 * | 5/2007 |

OTHER PUBLICATIONS

Advani, Suresh, and Sozer, M., "*Process Modeling in Composite Manufacturing*," 2002, 270 Madison Ave., NY, NY 10016; Marcel Dekker, Inc., pp. 1-223.

Allende, Melquiades, , et al., "*Characterization and Analysis of Flow Behavior in the FASTRAC Process for the Manufacture of Sandwich and Core Composite Structures*," 48th International SAMPE Symposium and Exhibition, May 11-15, 2003, 0891-0138(48):303-311.

Allende, Melquiades., et al., "*Experimental and Numerical Analysis of Flow Behavior in the FASTRAC Liquid Composite Manufacturing Process*." Polymer Composites, Aug. 2004, vol. 25, No. 4, pp. 384-396.

Alms, Justin, et al., "*Simulation and experimental validation of flow flooding chamber method of resin delivery in liquid composite molding*," Composites: Part A, 38 (2007), pp. 2131-2141.

Bickerton, Simon, et al., "*Design and application of actively controlled injection schemes for resin-transfer molding*, "Composites Science and Technology, vol. 61, (2001), pp. 1625-1637.

Bruschke, M. V., et al., "*A Finite Element/Control Volume Approach to Mold Filling in Anisotrophic Porous Media*," Polymer Composites, Dec. 1990, vol. 11, No. 6, pp. 398-405.

Correia, N. C., et al., "*Use of Resin Transfer Molding Simulation to Predict Flow, Saturation, and Compaction in the VARTM Process*," Journal of Fluids Engineering, Mar. 2004, vol. 126, pp. 210-215.

Devillard, Mathieu, et al., "*On-line Characterization of Bulk Permeability and Race-tracking During the Filling Stage in Resin Transfer Molding Process*," Journal of Composite Materials, vol. 37, No. 17/2003, pp. 1525-1541.

Fuqua, Michael, et al., "*A Port Injection Process for Improved Resin Delivery and Flow Control in Vacuum-Assisted Resin Transfer Molding*," ASME International Mechanical Engineering Congress & Exposition, Nov. 5-11, 2006, pp. 1-13.

Gokce, Ali, et al., "*Permeability estimation algorithm to simultaneously characterize the distribution media and the fabric preform in vacuum assisted resin transfer molding process*," Composites Science and Technology, 65 (2005), pp. 2129-2139.

Hsiao, Kuang-Ting, et al., "*Simulation based flow distribution network optimization for vacuum assisted resin transfer moulding process*," Modelling Simul. Mater. Sci. Eng., 12 (2004), pp. S175-S190.

Johnson, R.J., et al., "*Flow control using localized induction heating in VARTM process*," Composites Science and Technology, 67 (2007), pp. 669-684.

Johnson, R.J., et al., "*Simulation of active flow control based on localized preform heating in a VARTM process*," Composites: Part A, 37 (2006), pp. 1815-1830.

Kasprzak, Scott, et al., "*A Robotic System for Real-time Resin Flow Modification During Vacuum-Assisted Resin Transfer Molding*," ASME International Mechanical Engineering Congress and Exposition, Nov. 5-10, 2006, pp. 1-9.

Lawrence, Jeffrey, et al., "*Use of Sensors and Actuators to Address Flow Disturbances During the Resin Transfer Molding Process*," Polymer Composites, Apr. 2003, vol. 24, No. 2, pp. 237-248.

Lawrence, Jeffrey, et al., "*Dependence Map-based Flow Control to Reduce Void Content in Liquid Composite Molding*," Materials and manufacturing Processes, 20:933-960, (2005).

Lawrence, Jeffrey, et al., "*Automated manufacturing environment to address bulk permeability variations and race tracking in resin transfer molding by redirecting flow with auxiliary gates*," Composites: Part A, 36 (2005), pp. 1128-1141.

Lawrence Jeffrey, et al., "*Experimental Study to Illustrate Flow Control in Presence of Race Tracking Disturbances in Resin Transfer Moulding*," Advanced Composites Letter, vol. 12, No. 3, (2003), pp. 103-112.

Marsh, George, "*Putting SCRIMP in context*," Reinforced Plastics, Jan. 1997, pp. 22-26.

Rigas, Elias J., et al., "*Development of a Novel Processing Technique for Vacuum Assisted Resin Transfer Molding (VARTM)*," 46th International Sampe Symposium and Exhibition; Long Beach, CA, May 6, 2001, pp. 1086-1094.

Šimáček, Pavel, et al., "*Desirable Features in Mold Filling Simulations for Liquid Composite Molding Processes*," Polymer Composites, Aug. 2004, vol. 25, No. 4, pp. 355-367.

Šimáček, Pavel, et al., "*Modeling resin flow and fiber tow saturation induced by distribution media collapse in VARTM*," Composites Science and Technology, 67 (2007), pp. 2757-5769.

Walsh, Shawn M., et al., "*Minimizing Cycle Time and Part Mark-off in the FASTRAC Process*," 33$^{rd}$ International SAMPE Technical Conference, Nov. 5-8, 2001, pp. 1398-1407.

Alms, et al., "Flow Modification Process for Vacuum Infusion Using Port-Based Resin Flow Control," SAMPE Journal, 45(2):54-63 (Mar./Apr. 2009).

Alms, et al., "In-plane permeability characterization of the vacuum infusion processes with fiber relaxation," Int. J. Mater Form, 9 pages, (Mar. 20, 2010).

Alms, et al., "Liquid Composite Molding Control Methodologies using Vacuum Induced Preform Relaxation," Composites: Part A, 42:57-65 (2011).

Alms, et al., "Mechanical properties of composite structures fabricated with the vacuum induced preform relaxation process," Composite Structures, 92:2811-2816 (2010).

Bickerton, S. et al., "Experimental Analysis and Numerical Modeling of Flow Channel Effects in Resin Transfer Molding," Polymer Composites, Feb. 2000, vol. 21, No. 1, 134-153.

Dai, J. et al., "A Comparative Study of Vacuum-Assisted Resin Transfer Molding (VARTM) for Sandwich Panels," Polymer Composites, Dec. 2003, vol. 24, No. 6, 672-685.

Hammami, Adel, "Key Factors Affecting Permeability Measurement in the Vacuum Infusion Molding Process," Polymer Composites, Dec. 2002, vol. 23, No. 6, 1057-1067.

Hsiao, K-T. et al., 'A Closed Form Solution for Flow During the Vacuum Assissted Resin Tranfser Molding Process,' Journal of Manufacturing Science and Engineering; Aug. 2000; vol. 122; pp. 463-475.

International Search Report issued in PCT/US2010/045850 filed on Aug. 18, 2010, mailed Jun. 23, 2011.

Johnson, et al., 'Enhancement of flow in VARTM using localized induction heating,' Composites Science and Technology, 63:2201-2215 (2003).

Johnson, et al., "Active Control of Reactive Resin Flow in a Vacuum Assisted Resin Transfer Molding (VARTM) Process," Journal of Composite Materials, 42 (Dec. 2008):1205-1229 (2008).

Lawrence, et al., "An approach to couple mold design and on-line control to manufacture complex composite parts by resin transfer molding," Composites: Part A, 33:981-990 (2002).

Lawrence, et al., "Automated manufacturing environment to address bulk permeability variations and race tracking in resin transfer molding by redirecting flow with auxiliary gates," Composites: Part A, 36:1128-1141 (2005).

Lawrence, et al., "Design and Testing of a New Injection Approach for Liquid Composite Molding," Journal of Reinforced Plastics and Composites, 23 (15/2004):1625-1638 (2004).

Lindgren, et al., "Styrene Emissions from the Spray-Up and Vacuum Injection Processes—A Quantitative Comparison," AIHA Journal, 63:184-189 (2002).

Markicevic, B. et al.,"Role of Flow Enhancement Network during Filling of Fibrous Porous Media," Journal of Porous Media, 2005, vol. 8, No. 3, 281-297.

Modi, et al., "Active control of the vacuum infusion process," Composites: Part A, 38:1271-1287 (2007).

Nalla, et al., "A multi-segment injection line and real-time adaptive, model-based controller for vacuum assisted resin transfer molding," Composites: Part A, 38:1058-1069 (2007).

Written Opinion issued in PCT/US2010/045850 filed on Aug. 18, 2010, mailed Jun. 23, 2011.

Wu, Tom J. et al., "The Bearing Strength of E-Glass/Vinyl-Ester Composites Fabricated by VARTM," Composites Science and Technology; 1998, vol. 58, 519-1529.

* cited by examiner

APPARATUS AND METHOD FOR PREFORM RELAXATION AND FLOW CONTROL IN LIQUID COMPOSITE MOLDING PROCESSES

CROSS REFERENCE TO RELATED APPLICATIONS

This application claims priority to provisional application number U.S. 61/088,444, filed Aug. 13, 2008, which is incorporated herein, in its entirety, by reference.

STATEMENT REGARDING FEDERALLY SPONSORED RESEARCH

The U.S. Government has a paid-up license in this invention and the right in limited circumstances to require the patent owner to license others on reasonable terms as provided for by the terms of ONR Grant No. N00014-06-1-1000, awarded by the Office of Naval Research.

BACKGROUND OF THE INVENTION

Efforts in the composites manufacturing industry have been directed toward low cost manufacturing processes such as Liquid Composite Molding (LCM). In any LCM process, a fibrous preform material is placed into a mold, which is then closed and sealed to prevent leakage before a liquid resin is injected into the mold. The most common LCM process that uses two sided rigid tooling is called Resin Transfer Molding (RTM). The rigid tooling in RTM encompasses the fibers and compresses them to the desired fiber volume fraction. Resin is then injected through ports located in the rigid tooling to fill the empty spaces between stationary fibers before the resin cures. An LCM process that uses single sided tooling is Vacuum Assisted Resin Transfer Molding (VARTM), in which the mold is sealed by enveloping the fabric with a non-rigid polymer or film adhered to the tooling surface with a sealant tape, forming a vacuum bag. A vacuum pump is used to compact the preform and draw the resin from a reservoir with atmospheric pressure. Several variations of this process have been introduced to overcome the disadvantage of lengthy filling times, which is especially protracted when manufacturing large structures. One particular variation of VARTM that significantly decreases filling time is called the Seemann's Composite Resin Infusion Molding Process (SCRIMP). SCRIMP involves placement of a layer of highly permeable fabric, commonly referred to as the distribution media, on top of fiber mats and inside the vacuum bag to increase the flow rate of resin into the part being manufactured.

Both the VARTM and SCRIMP processes have drawbacks, resulting in a need to improve the process of liquid composite molding.

SUMMARY OF THE INVENTION

Briefly, the present invention provides a vacuum-induced injection molding apparatus comprising a tool surface having an injection port extending therethrough and a flexible film extending over and sealingly coupled to the tool surface. The flexible film comprises an outer surface and an inner surface such that the flexible film inner surface and the tool surface define a volume. A vacuum chamber is sealingly coupled to the outer surface of the flexible film. A vacuum port is in fluid communication with the volume.

The present invention also provides a method of injection molding a polymer matrix composite. The method comprises the steps of providing a tool surface having an injection port extending therethrough; extending a flexible film over and sealingly coupling the flexible film to the tool surface, forming a volume; layering a plurality of fabric preforms within the volume; sealing an external vacuum chamber to the flexible film proximate to the injection port, wherein the external vacuum chamber includes a vacuum port; drawing a vacuum through the vacuum port, wherein the vacuum drawing draws the flexible film and the plurality of fabric preforms toward the vacuum port; and injecting a polymer resin through the injection port and between the plurality of fabric preforms.

BRIEF DESCRIPTION OF THE DRAWINGS

The foregoing summary, as well as the following detailed description of an exemplary embodiment of the invention, will be better understood when read in conjunction with the appended drawings, which are incorporated herein and constitute part of this specification. For the purposes of illustrating the invention, there are shown in the drawings exemplary embodiments of the invention. It should be understood, however, that the invention is not limited to the precise arrangements and instrumentalities shown. In the drawings, which are not drawn to scale, the same reference numerals are employed for designating the same elements throughout the several figures. In the drawings.

DETAILED DESCRIPTION OF THE INVENTION

Certain terminology is used herein for convenience only and is not to be taken as a limitation on the present invention. The terminology includes the words specifically mentioned, derivatives thereof and words of similar import. Features of exemplary embodiments of this invention will now be described with reference to the figures. It will be appreciated that the spirit and scope of the invention is not limited to the embodiments selected for illustration. Also, it should be noted that the drawings are not rendered to any particular scale or proportion. It is contemplated that any of the configurations and materials described hereafter can be modified within the scope of this invention.

The present invention improves upon the VARTM and SCRIMP processes discussed above by adding a vacuum induced pre-form relaxation (VIPR) chamber over at least a portion of the mold in order to enhance resin flow through the mold. The VIPR process introduces an additional step in processes such as VARTM and SCRIMP, which makes the use of injection ports attractive for on-line resin flow control. The inventive process is a variation of prior work in the field of resin delivery referred to as the Flow Flooding Chamber (FFC) method.

The FFC method of resin delivery consists of a chamber formed by a rigid external plate and a seal that covers the entire surface of a part, forming a volume that can be evacuated. The principle of the FFC method of resin delivery is to stretch and lift the VARTM vacuum bag, thus creating an open gap above the fabric layers and below the vacuum bag. Resin flows quickly into this gap due to extremely low resistance across the entire surface of the part. When the vacuum in the FFC chamber is released, the vacuum bag is again subjected to the atmospheric pressure, which closes the gap by driving the resin through the thickness of the part. The FFC process behaves more like SCRIMP, with the gap serving as a collapsible distribution media and without the need to lay up the part with distribution media and peel ply, which are then removed and discarded.

In order for the FFC method of resin delivery to be effective, the VARTM film must stretch and create an open gap between the preform and the film. This is possible when the vacuum within the FFC is at a much lower pressure than the pressure under the film. It is difficult, however, to control the gap thickness and the amount of resin flowing into the gap. The VIPR process is similar in that it utilizes an external rigid chamber, but influences the preform properties to affect the flow behavior without creating the gap.

The VIPR chamber according to the several embodiments of the present invention may be used in both the VARTM process without distribution media, which is referred to as V-VIPR, and the SCRIMP process, with distribution media, which is referred to as S-VIPR. In addition, the VIPR chamber can be configured to cover only a portion of the preform, thus influencing flow in a local region of interest.

In the VIPR process, the VIPR chamber is placed over a region of interest and the vacuum applied to the chamber is significantly less than the vacuum used to drive the flow of resin. In this configuration, the VARTM film will not lift off the preform to form a gap, but will simply relax the fabric layers, causing the fabric layers to be more permeable.

Figure 1:
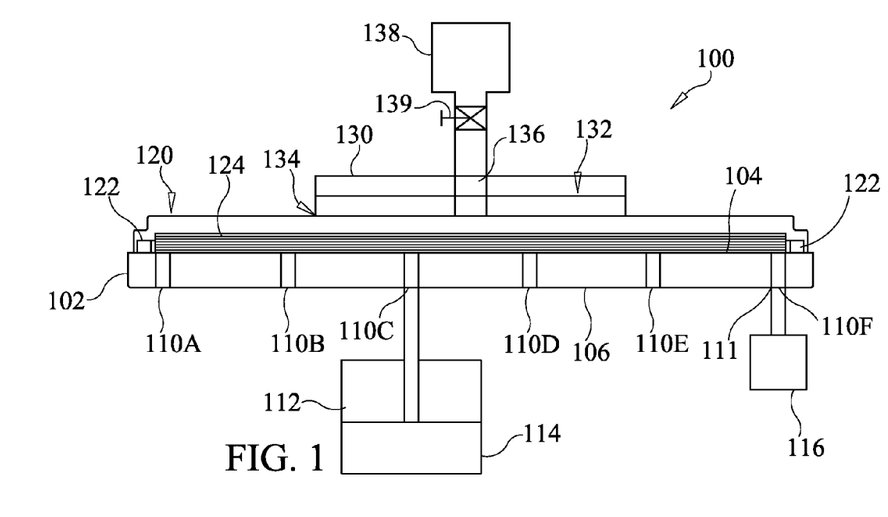
FIG. 1 is a side elevational view of a vacuum-induced molding apparatus according to a first exemplary embodiment of the present invention.

Referring to FIG. 1, a vacuum-induced injection molding apparatus 100 according to a first embodiment of the present invention (V-VIPR) is disclosed. Apparatus 100 includes a rigid tooling surface 102 having a mold face 104. Mold face 104 provides a contour of a finished composite that is manufactured using apparatus 100. As shown in FIG. 1, mold face 104 may be generally planar. Those skilled in the art, however, will recognize that mold face 104 may instead be contoured.

Tooling surface 102 also includes an exterior face 106 that is juxtaposed away from mold face 104. A plurality of tool-side injection ports 110A through 110F extend through tooling surface 102 from exterior face 106 to mold face 104. A resin supply container 112 having a supply of resin 114 therein is coupled to one of injection ports 110C at exterior face 106.

A flexible polymer film 120 is disposed over tooling surface 102. Polymer film 120 is sealingly coupled to mold face 104 of tooling surface 102 by a sealant 122. An exemplary sealant may be a vacuum bag sealant tape, supplied by Airtech Advance Materials Group of Hunting Beach Calif. Polymer film 120 includes an outer surface and an inner surface such that the film inner surface and mold face 104 define a volume. A plurality of fabric preforms 124 are layered on mold face 104 within the volume between mold face 104 and polymer film 120.

A VIPR chamber 130 is sealingly, but releasably, coupled to at least a portion of the outer surface of polymer film 120 in the region where resin supply container 112 is coupled to tooling surface 102. As shown in FIG. 1, VIPR chamber 130 is disposed directly over the tool side injection port 110C that is coupled to resin supply container 112. One of the injection ports 110, in this FIG. 1 illustrated as 110F, is used as a vent 111 to allow air to escape molding apparatus 100 during the molding process.

VIPR chamber 130 is a rigid chamber, including a rigid plate 132 that contacts polymer film 120. A sealant 134, such as, for example, the Airtech vacuum bag sealant tape discussed above, may be used to seal VIPR chamber 130 to polymer film 120. A VIPR chamber vacuum port 136 extends through rigid plate 132 and is in fluid communication with the volume. A vacuum device 138 having a vacuum regulator 139 is coupled to vacuum port 136 to draw a vacuum from the volume.

As VIPR chamber 130 is placed on a selected region of mold face 104, polymer film 120 compresses the fabric preforms 124 within that region with less than one atmospheric pressure. With less compression applied to the region, the pores between the fibers of fabric preforms 124 are larger, and therefore the region has a lower fiber volume fraction. The permeability of the fabric preforms 124 in this region is increased and resin 114 flows more easily through fabric preforms 124 due to the larger pores.

In operation, a vacuum is applied to VIPR chamber 130 via vacuum device 138 and vacuum port 136. The vacuum lifts fabric preforms 124. Additionally, the vacuum lifts polymer film 120 from fabric preforms 124. A gap is formed between polymer film 120 and mold face 104. Resin 114 is pumped into injection port 110C to which resin supply container 112 is coupled and into the volume formed by polymer film 120 over mold face 104. The vacuum causes the layers of fabric preform 120 to relax, making them permeable to the resin 114. Resin 114 consequently flows into the volume with less resistance than without VIPR chamber 130.

One advantage of injection ports 110A through 110F extending through tooling surface 102 to mold face 104 is that injection ports 110A through 110F are permanently mounted to mold face 104. Tool side injection ports 110A through 110F reduce the amount of work required while assembling fabric preform 124 as well as the amount of resin 114 used per part manufactured. Additionally, injection ports 110A through 110F may be distributed along the part being manufactured to create desired flow patterns for successful filling of a variety of preform geometries.

To optimize injection of resin 114, the distance between injection ports 110A through 110F can be adjusted. Since the porous volume of fabric preform 124 increases when VIPR chamber 130 is used, excess resin 114 will be present in the region where VIPR chamber 130 is used. Once the flow front of resin 114 reaches the end of VIPR chamber 130, the vacuum applied to VIPR chamber 130 can be released. Atmospheric pressure will force any excess resin 114 into any remaining dry sections of fabric preform 124. The distance between injection ports 110A through 110F can be optimized so that the flow front of resin 114 reaches the next injection port 110 at approximately the same time when all excess resin 114 is disbursed.

After resin 114 has filled the volume in the area of VIPR chamber 130, VIPR chamber 130 may be removed from polymer film 120 and relocated over a different injection port 110. Resin supply container 112 is then moved and coupled to the selected injection port 110, where the process is repeated. During the injection process, air trapped within the volume between polymer film 120 and mold face 104 may be ejected through vent 111. Optionally, a vacuum pump 116 may be coupled vent 111 to assist in evacuating air from the volume.

Figure 2:
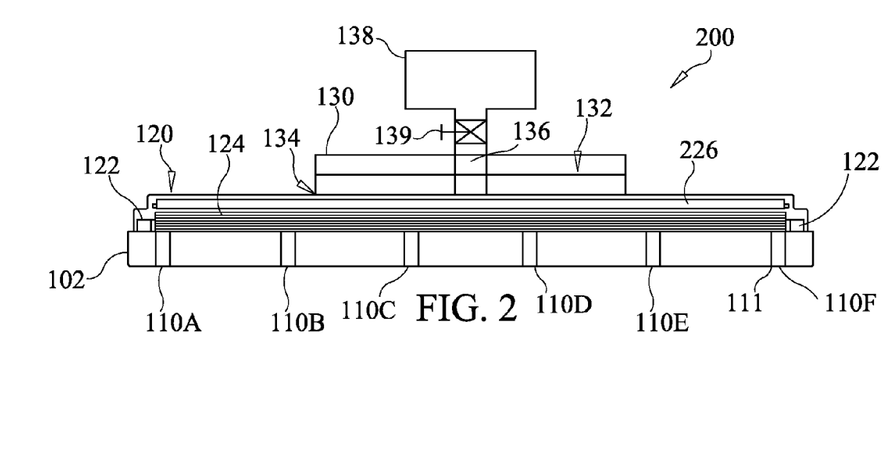
FIG. 2 is a side elevational view of a vacuum-induced molding apparatus according to a second exemplary embodiment of the present invention.

FIG. 2 discloses a vacuum-induced molding apparatus 200 according to an alternative embodiment of the present invention (S-VIPR). Apparatus 200 is similar to molding apparatus 100, but further includes a distribution media 226 disposed between fabric preform 124 and polymer film 120. Distribution media 226 is constructed by knitting nylon filaments to form a highly permeable fabric.

Tool side ports in SCRIMP have not been effective because the transverse through thickness permeability of most fabrics is very low under full vacuum. Hence, resin 114 entering from the tool side injection port has to overcome the resistance through the thickness of the fabric before it can reach distribution media 226 and spread over the entire surface of the part. In the VIPR method, when VIPR chamber 130 is placed above injection ports 110C and 110D in tooling surface 102 as shown in FIG. 2, the fabric region under VIPR chamber 130 relaxes, increasing the through thickness permeability. This results in resin 114 reaching distribution media 226 with little resistance, making injection port 110C and 110D an effective mode for flow control. One advantage of tool side injection ports 110A through 110F as opposed to injection lines along the distribution media side is that ports 110A through 110F are permanently mounted to tooling surface 102 and are small. Tool side injection ports 110A through 110F reduce the amount of work done while laying-up the preform and material used per part that is manufactured. Also one could distribute ports 110A through 110F along the part to create desired flow patterns for successful filling of a variety of preform geometries.

When using distribution media 226, when VIPR chamber 130 is placed above an injection ports 110C and 110D, the region of fabric preform 124 underneath VIPR chamber 130 relaxes, increasing the through-thickness permeability, which results in resin 114 reaching distribution media 226 with little resistance.

The VIPR principle was initially investigated and validated with an experiment where a short length of 24 ounce E-glass fiber preform 124 provided by Saint Gobain Performance Plastics was filled using the established SCRIMP technique, using full vacuum to inject the resin. The identical experiment was repeated with the aid of the S-VIPR technique, where VIPR chamber 130 was placed on top of distribution media 226 and covered the entire mold face 104 and full vacuum was again used to inject resin 114 and 5 inches of mercury (in. Hg) vacuum was applied within VIPR chamber 130 to relax the compacted preform fabric layers 124, increasing their in-plane and transverse permeabilities.

The results of the experiments show that the normalized fill time achieved with VIPR chamber 130 was reduced approximately 2.8 times compared to conventional SCRIMP.

Figure 3:
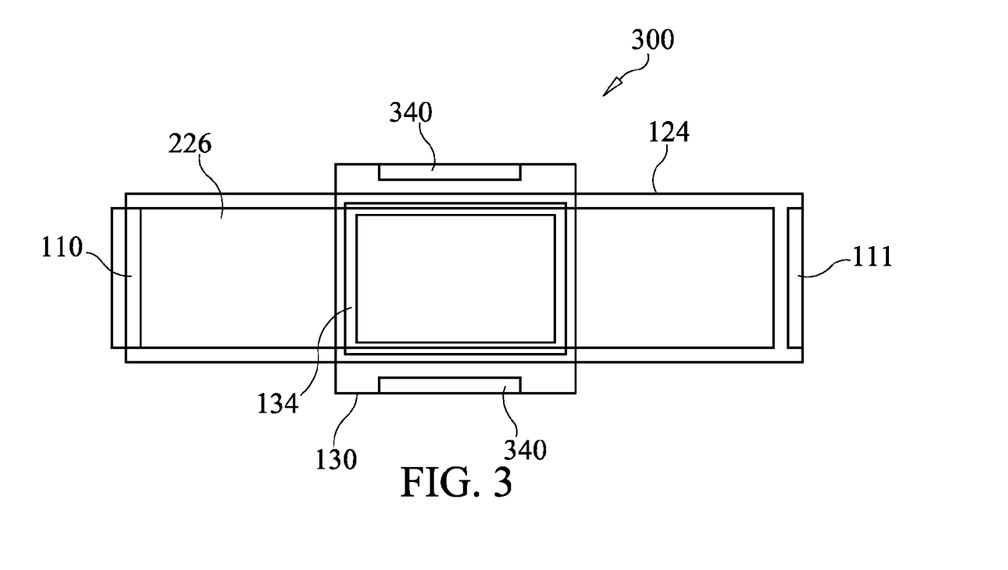
FIG. 3 is a top plan view of a vacuum-induced molding apparatus according to a third exemplary embodiment of the present invention.
Figure 4:
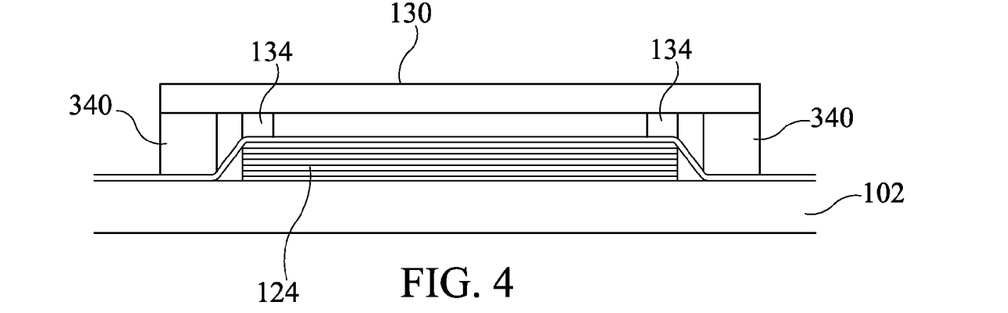
FIG. 4 is a side elevational view of the vacuum-induced molding apparatus shown in FIG. 3.

Once a vacuum is applied in chamber 130, fabric preform 124 under VIPR chamber 130 relaxes, increasing the permeability of the fibers of fabric preform 124 located under VIPR chamber 130. However, the fibers which lie directly underneath sealant 134 of VIPR chamber 130 become greatly compressed because the pressure is directly transferred to the frame of VIPR chamber 130. Since a portion of the frame is perpendicular with the direction of the resin flow, the concentrated, highly-compressed portion of the mold becomes a significant barrier to resin flow. To overcome this, in an alternative embodiment, a molding apparatus 300, shown in FIGS. 3 and 4, stiffening bars 340 were attached to the sides of VIPR chamber 130, transferring this pressure to tooling surface 102 rather than fabric preform 124, relieving the compression of fabric preform 124 under sealant 134, as shown in FIGS. 3 and 4. Hence for all remaining experiments, stiffening bars 340 were used when utilizing VIPR chamber 130. Stiffening bars 340 extend between film 120 and mold surface 104 to transfer weight of VIPR chamber 130 away from fabric preform 124 and to relieve compression of fabric preform 124 under sealant 134. Using VIPR chamber 130 with no stiffening bar may be useful where the desired goal is to decrease the flow front velocity rather than speed it up.

The next issue explored was the range of distance away from a resin injection site for which the use of VIPR chamber 130 is effective. To study the influence of chamber location from the injection sites on the flow front velocity, VIPR chamber 130 was positioned at three different locations in the mold along the flow direction. The chamber length was always one third the overall length of the mold. Three experiments were conducted in which VIPR chamber 130 was placed at the first, second, or last third of the mold. The results indicated that, the closer the chamber to the injection source, the larger effect is seen on the flow front velocity.

In side-by-side comparisons of the flow front location for a traditional SCRIMP method versus the S-VIPR method showed that when the VIPR chamber was placed adjacent to or around the injection port, the flow front location of the S-VIPR method advanced faster than the flow front location for the SCRIMP method. In similar side-by-side comparisons with the VIPR chamber placed away from the injection port, the flow-front advancement speeds were almost exactly the same. As verified by these comparisons, greater flow speed is thus facilitated by locating the VIPR chamber closer to the injection port.

To optimize the process, the distance between injection sites can be adjusted. Because the porous volume increases when VIPR chamber 130 is used, there is typically excess resin within the region where chamber is used. Once the flow front reaches the end of VIPR chamber 130, the vacuum may be released, allowing atmospheric pressure to force any excess resin into any remaining dry sections of the part. The distance between sequential injection sites can be optimized so that the flow front reaches the next injection site around the same time that all the excess resin is disbursed.

EXAMPLES

Several experiments were carried out in order to understand the behavior of the VIPR process and the potential implications for on-line control. For consistency the same amount and type of materials were used in all experiments except where noted.

These experiments focused on the ability of the VIPR process to decrease the fill time in a vacuum infusion molding process. Since the SCRIMP process has been identified as a preferred vacuum infusion technique, it was selected as the basis of comparison for the experiments. The use of multiple sequential injection sites was used during the experimentation to mimic the current commercial manufacturing practice for large scale structures. The goal of the experiments was to demonstrate the advantage of tool side ports in V-VIPR without the use of the distribution media as compared to VARTM and SCRIMP.

In order to maintain a consistent basis of comparison for all the experiments, the parameters listed in Table 1 were used for all experiments.

TABLE 1

Materials and parameters used for all experiments.

| | |
|---|---|
| Fabric | 6 Layers of 24 ounce E-Glass Flow in the Warp Direction |
| Resin | Corn Syrup, Water, And Dye Mixture |
| Distribution Media | 1 Layer of Air Tech DM Flow in the Warp Direction |
| Injection Site Properties | Omega Tube Gap 0.25 inches Port Injection Diameter ⅜ inches |
| Mold Dimensions | Length ~0.6 meters Width ~0.2 meters Thickness ~5 millimeters |

Figure 5A:
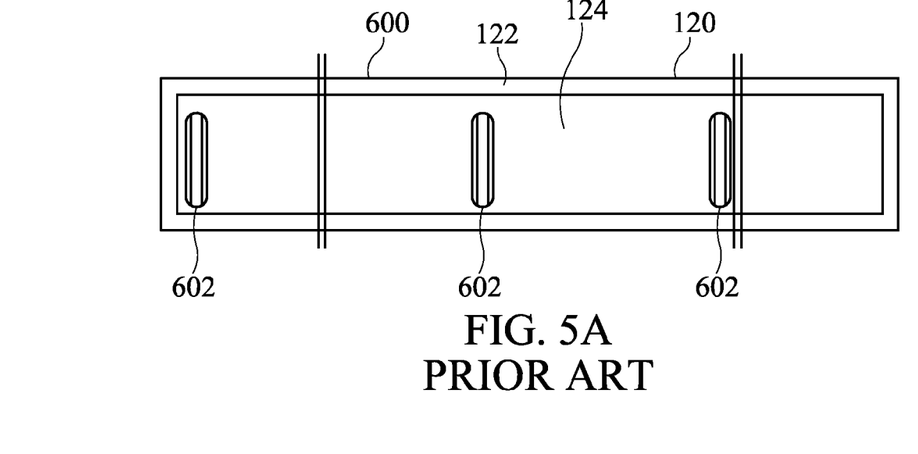
FIG. 5A is a top plan view of a prior art vacuum-induced molding apparatus.

For SCRIMP and VARTM processes, a tooling surface 600 shown in FIG. 5A was used. Three omega tubes 602 were located along the length of tooling surface 600. For the V-VIPR, as well as SCRIMP and VARTM, processes, a tooling surface 700 shown in FIG. 5B was prepared with drilled injection ports 710 along the length of tooling surface 700 in which some or all of ports 710 may or may not be used during an injection.

Figure 5B:
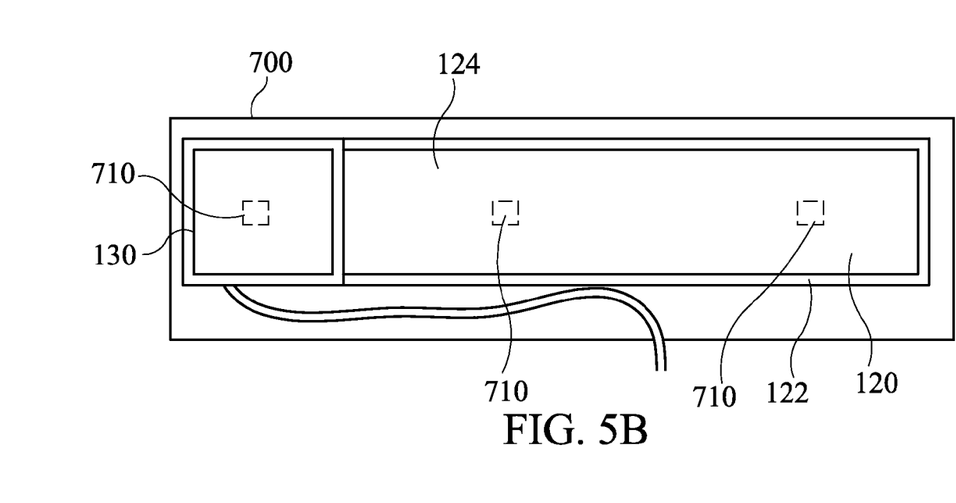
FIG. 5B is a top plan view of the vacuum-induced molding apparatus according to the first exemplary embodiment of the present invention.

For both tooling surfaces 600 and 700, fabric layers 124 were placed on the tooling surface. When conducting an experiment with SCRIMP, one layer of distribution media (not shown) was placed on top of the fabric layers 124. For comparison purposes, no distribution media was used during the V-VIPR process. The use of the V-VIPR process did not eliminate the possibility of using distribution media, but the goal was to explore the advantages of the V-VIPR process without the need for distribution media.

Next, fabric layers 124, with or without distribution media, were covered with a is non-porous polymer film 120 and sealed with sealant tape 122. A vacuum pump (not shown) then evacuated the air from the mold and simultaneously compressed the fabric layers 124. The vacuum was then cycled on and off twenty times in order to ensure consistent nesting between the fabric layers 124. During the V-VIPR process experiments, the VIPR chamber 130 was placed on top of the polymer film 120 over each injection site 710. A separate vacuum of 5 in. Hg was applied to VIPR chamber 130 and held until resin infused the entire region under VIPR chamber 130.

The infusion in all the experiments was initiated along the edge of the left side of tooling surfaces 600, 700, as shown in FIGS. 5A and 5B. When the resin reached the subsequent injection site locations 602, 710, that injection site was opened. In SCRIMP, the flow is two dimensional. Hence there are two possible cases when one could open subsequent injection sites 602, 710. For completeness, experiments were conducted for both scenarios. In case 1, the subsequent injection sites were opened when the flow front along the top (distribution media surface) reached the injection site and in case 2, subsequent injection sites were opened when the flow front along the bottom (tooling surface) reached the injection site. The V-VIPR process was conducted without distribution media so the flow front was one dimensional, similar to what is seen in the VARTM process.

Figure 6:
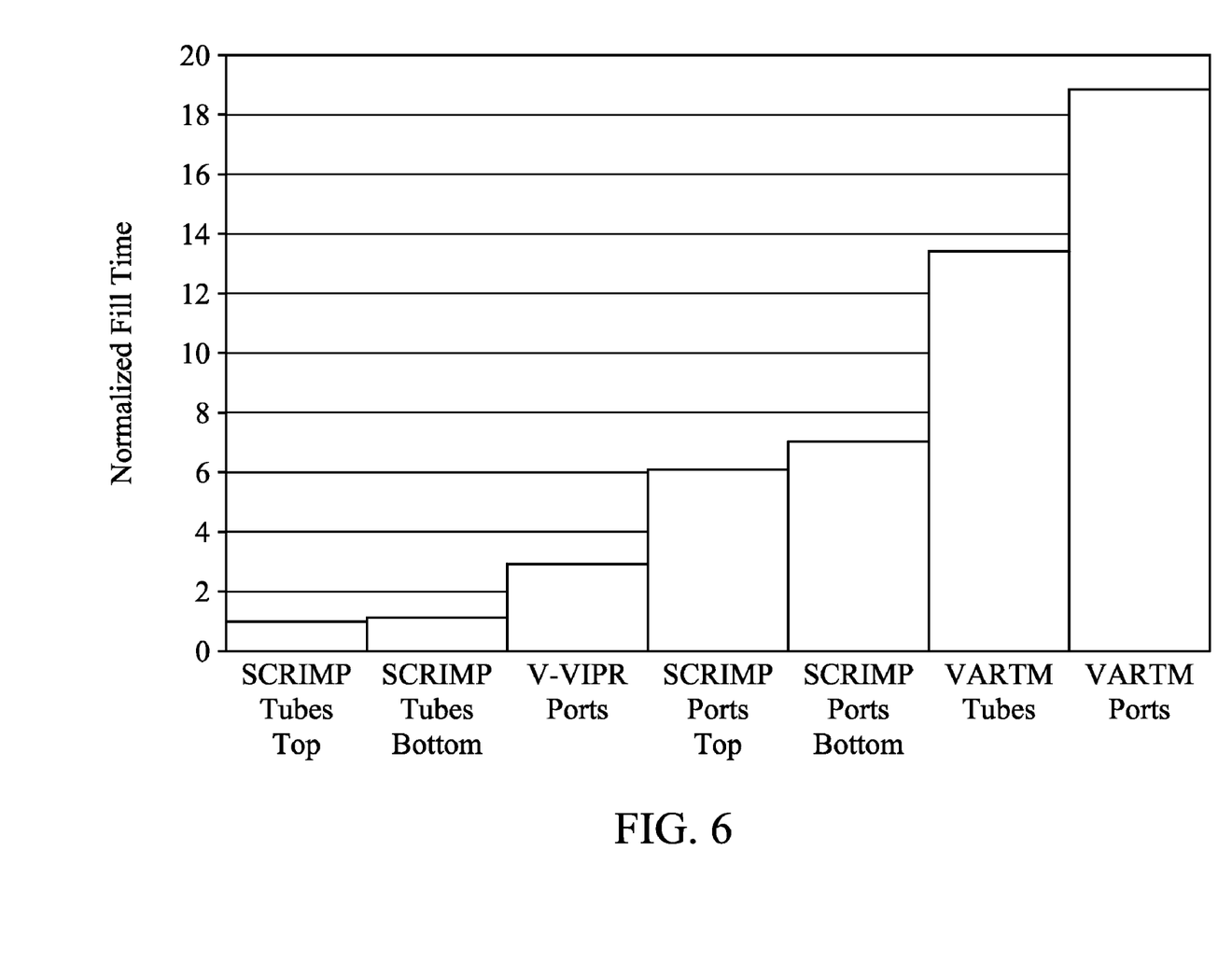
FIG. 6 is a bar chart illustrating Normalized Fill Time for the vacuum-induced molding apparatus according to the first exemplary embodiment of the present invention compared to prior art vacuum-induced molding apparatuses.

A total of seven experiments were performed, which compared the V-VIPR process with tool side ports 710 and no distribution media with SCRIMP and VARTM with tool side ports 710 as well as omega tubes 602, using traditional SCRIMP as the baseline comparison. The details of the experiments are listed in Table 2 and the resulting comparisons of fill times are shown in FIG. 6.

TABLE 2

The experimental processes, parameters, and descriptions for comparison experiments

| Infusion Technique | Description |
|---|---|
| SCRIMP Tubes Top | Omaga Tubes were used where sequential injection sites were initiated when the resin flow along the bag side (top surface) reaches the sequential injection site. This experiment formed the basis for normalization of all experimental data. |
| SCRIMP Tubes Bottom | Omega Tubes were used where sequential injection sites were initiated when the resin flow along the tool side (bottom surface) reaches the sequential injection site. |
| V-VIPR Ports | Ports were used, 5 inHg was used to relax the preform, sequential injection sites were initiated when resin flow reached the subsequent injection sites. |
| SCRIMP Ports Top | Ports were used where sequential injection sites were initiated when the resin flow along the bag side (top surface) reaches the sequential injection site. |
| SCRIMP Ports Bottom | Ports were used where sequential injection sites were initiated when the resin flow along the tool side (bottom surface) reaches the sequential injection site. |
| VARTM Tubes | Omega Tubes were used, sequential injection sites were initiated when resin flow reaches subsequent injection sites. |
| VARTM Ports | Ports were used, sequential injection sites were initiated when resin flow reaches subsequent injection sites. |

The results displayed in FIG. 6 show that the V-VIPR process can significantly increase the resin flow rate into the mold as compared to the VARTM process. The fill time for the V-VIPR process is between the fill times of the SCRIMP process using omega tubes 602 and ports 710. This result indicates that the V-VIPR process is more suited for on-line flow control than the SCRIMP process, since injection ports 710 are a preferred method of spatially controlling resin flow into a mold. Also displayed in the results is the trade-off of flow control and fill time between V-VIPR and SCRIMP using omega tubes 602. Although the V-VIPR process has a higher fill time for the same mold, it has an additional advantage of flow control. Also noteworthy is that the VIPR process may use distribution media and omega tubes 602, but such a change may lessen the degree of control the VIPR chamber would have on the infusion.

The experimental progress with the VIPR process may offer fully automated VARTM control with on-line feedback and flow correction. The use of distribution media is optional, but is effective in spreading excess resin collected in the chamber to remaining dry sections of the preform. The use of the VIPR process can be highly effective in reducing the filling time of large parts and offers many advantages over the standard SCRIMP process. The VIPR process allows one to do port-based control in VARTM processes.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A vacuum-induced injection molding apparatus comprising:
   a tool surface having an injection port extending therethrough;
   a flexible film extending over a preform and sealingly coupled to the tool surface, wherein the flexible film comprises an outer surface and an inner surface such that the flexible film inner surface and the tool surface define a first volume;

a rigid vacuum chamber having a periphery sealingly coupled to a first portion of the outer surface of the flexible film, the rigid vacuum chamber defining a second volume between an interior of the vacuum chamber and the outer surface of the first portion of the flexible film within the periphery of the vacuum chamber;

at least one stiffening bar separate from the periphery of the rigid vacuum chamber, the at least one stiffening bar located outside the first volume and extending between the tool surface and an interface with the vacuum chamber, the interface between the stiffening bar and the vacuum chamber configured to permit the stiffening bar to receive at least a portion of a reaction force transmitted by the vacuum chamber when the second volume contains a relative vacuum; and a vacuum port in fluid communication with the second volume.

2. The vacuum-induced injection molding apparatus according to claim 1, wherein the vacuum chamber is releasably coupled to the outer surface of the flexible film.

3. The vacuum-induced injection molding apparatus according to claim 1, further comprising a resin supply coupled to the injection port.

4. The vacuum-induced injection molding apparatus according to claim 1, further comprising an optional distribution media disposed between the flexible film and the tool surface.

5. A method of injection molding a polymer matrix composite comprising the steps of:
(a) providing a tool surface having at least one injection port extending therethrough;
(b) layering a plurality of fabric preforms on the tool surface;
(c) extending a flexible film over the plurality of fabric preforms and sealingly coupling the flexible film to the tool surface, creating a first volume defined by the flexible film and the tool surface, with the flexible film in contact with at least a portion of the plurality of fabric preforms;
(d) sealing a periphery of a rigid vacuum chamber to a portion of the flexible film in a first location proximate the injection port, wherein the rigid vacuum chamber includes a vacuum port, the rigid vacuum chamber defining a second volume between an interior of the vacuum chamber and the portion of the flexible film within the periphery of the vacuum chamber;
(e) drawing a vacuum through the vacuum port, the vacuum having a magnitude in a range sufficient to relax the fabric preform layers while maintaining the contact between the portion of the plurality of fabric preforms and the flexible film;
(f) receiving, with at least one stiffening bar separate from the periphery of the rigid vacuum chamber, at least a portion of a reaction force transmitted by the rigid vacuum chamber when the second volume contains a relative vacuum, the at least one stiffening bar located outside the first volume and extending between the tool surface and an interface with the vacuum chamber, and
(g) injecting a polymer resin through the at least one injection port and between the plurality of fabric preforms.

6. The method according to claim 5, further comprising the steps of:
(h) removing the vacuum;
(i) unsealing the vacuum chamber from the flexible film;
(j) moving the vacuum chamber to a second location; and
(k) repeating steps (d)-(g).

7. The method according to claim 5, further comprising the step of applying a vacuum to the first volume.

8. The method according to claim 7, wherein the step of applying a vacuum to the first volume comprises drawing the polymer resin away from the injection port.

9. The method according to claim 5, further comprising disposing an optional distribution media between the flexible film and the fabric preforms.

10. The method according to claim 5, further comprising positioning one or more stiffening bars between an interface with the vacuum chamber and the tooling surface, the one or more stiffening bars configured to support at least a portion of a reaction force transmitted by the vacuum chamber when a vacuum is drawn through the vacuum chamber.

11. The method of claim 10 further comprising maintaining the sealing relationship between the vacuum chamber periphery and the portion of the flexible film while transmitting the at least a portion of the reaction force to the one or more stiffening bars.

12. A vacuum-induced injection molding apparatus comprising:
a tool surface having an injection port extending therethrough from an upper side to a lower side of the tool surface;
a flexible film extending over a preform and sealingly coupled to the tool surface, the flexible film and the preform positioned on the upper side of the tool surface, wherein the flexible film comprises an outer surface and an inner surface such that the flexible film inner surface and the tool surface define a first volume on the upper side of the tool surface;
a rigid vacuum chamber having a periphery sealingly coupled to a first portion of the outer surface of the flexible film, the rigid vacuum chamber defining a second volume between an interior of the vacuum chamber and the outer surface of the first portion of the flexible film within the periphery of the vacuum chamber;
at least one stiffening bar located outside the first volume and extending between the upper side of the tool surface and an interface with the vacuum chamber, the interface between the stiffening bar and the vacuum chamber configured to permit the stiffening bar to receive at least a portion of a reaction force transmitted by the vacuum chamber when the second volume contains a relative vacuum; and
a vacuum port in fluid communication with the second volume.

13. The vacuum-induced injection molding apparatus according to claim 12, wherein the vacuum chamber is releasably coupled to the outer surface of the flexible film.

14. The vacuum-induced injection molding apparatus according to claim 12, further comprising a resin supply coupled to the injection port.

15. The vacuum-induced injection molding apparatus according to claim 12, further comprising an optional distribution media disposed between the flexible film and the tool surface.

* * * * *